(12) United States Patent
Rooney et al.

(10) Patent No.: US 11,932,816 B2
(45) Date of Patent: Mar. 19, 2024

(54) COKE AND TAR REMOVAL FROM A FURNACE EFFLUENT

(71) Applicant: ExxonMobil Chemical Patents Inc., Baytown, TX (US)

(72) Inventors: Mark A. Rooney, Pasadena, TX (US); Darian E. Orozco, Austin, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 166 days.

(21) Appl. No.: 17/310,062

(22) PCT Filed: Feb. 13, 2020

(86) PCT No.: PCT/US2020/018092
§ 371 (c)(1),
(2) Date: Jul. 14, 2021

(87) PCT Pub. No.: WO2020/168062
PCT Pub. Date: Aug. 20, 2020

(65) Prior Publication Data
US 2022/0064544 A1    Mar. 3, 2022

Related U.S. Application Data

(60) Provisional application No. 62/806,274, filed on Feb. 15, 2019.

(30) Foreign Application Priority Data

Jun. 12, 2019   (EP) .................................. 19179668

(51) Int. Cl.
*B04C 5/04*    (2006.01)
*B01D 19/00*   (2006.01)
(Continued)

(52) U.S. Cl.
CPC ......... *C10G 31/10* (2013.01); *B01D 19/0057* (2013.01); *B01D 19/0063* (2013.01);
(Continued)

(58) Field of Classification Search
CPC .......... C10G 31/10; C10G 55/04; C10G 9/36; B01D 19/0057; B01D 19/0063;
(Continued)

(56) References Cited

U.S. PATENT DOCUMENTS 1,683,767 A   9/1928  Gustav
2,776,931 A   1/1957  Chaney et al.
(Continued)

FOREIGN PATENT DOCUMENTS

CN    204344199 U    5/2015

*Primary Examiner* — Dung H Bui

(57) ABSTRACT

In some examples, coke, tar, or a mixture thereof can be removed from a furnace effluent. The furnace effluent can include coke, tar, or the mixture thereof and can be contacted with a first quench liquid to produce a quenched mixture, wherein the first quench liquid can include a first steam cracker naphtha, a first steam cracker gas oil, a first steam cracker quench oil, or a mixture thereof. The quenched mixture can be introduced into a first inlet of a centrifugal separator drum. A vapor product and a centrifugal separator drum bottoms can be separated from the quenched mixture, wherein the centrifugal separator drum bottoms can include at least a portion of the coke, tar, or the mixture thereof. The centrifugal separator drum bottoms can be recovered from a first outlet of the centrifugal separator drum.

22 Claims, 2 Drawing Sheets

(51) Int. Cl.
  *B01D 21/26* (2006.01)
  *B04C 5/081* (2006.01)
  *B04C 5/20* (2006.01)
  *B04C 11/00* (2006.01)
  *C10G 31/10* (2006.01)

(52) U.S. Cl.
  CPC .............. *B01D 21/267* (2013.01); *B04C 5/04* (2013.01); *B04C 5/081* (2013.01); *B04C 5/20* (2013.01); *B04C 11/00* (2013.01)

(58) Field of Classification Search
  CPC ......... B01D 21/267; B04C 5/04; B04C 5/081; B04C 5/20; B04C 11/00
  See application file for complete search history.

(56) References Cited

U.S. PATENT DOCUMENTS

| | | | |
|---|---|---|---|
| 3,365,387 A | 1/1968 | Cahn et al. | |
| 3,928,186 A * | 12/1975 | Zemanek | B04C 5/081 209/729 |
| 4,151,083 A * | 4/1979 | Dove | B04C 5/04 209/731 |
| 5,681,450 A * | 10/1997 | Chitnis | C10G 11/18 208/126 |
| 8,864,977 B2 | 10/2014 | Spicer | |
| 9,039,811 B2 | 5/2015 | Eisinger et al. | |
| 2005/0194290 A1 | 9/2005 | Annesley et al. | |
| 2011/0253600 A1* | 10/2011 | Niccum | C10G 31/10 209/132 |
| 2012/0167767 A1* | 7/2012 | Pavel | C10B 55/10 95/271 |
| 2013/0098466 A1* | 4/2013 | Manek | C07C 7/20 137/13 |
| 2013/0197285 A1* | 8/2013 | Shafi | C10G 45/44 208/57 |
| 2015/0152338 A1* | 6/2015 | Respini | C10G 75/04 585/501 |
| 2018/0238620 A1 | 8/2018 | Baxter et al. | |
| 2019/0055480 A1* | 2/2019 | Oprins | C10G 53/06 |
| 2019/0060918 A1* | 2/2019 | Boltersdorf | B04C 5/04 |
| 2019/0241819 A1* | 8/2019 | Van Willigenburg | C10G 31/06 |
| 2019/0367822 A1* | 12/2019 | Kandel | C10G 9/36 |

* cited by examiner

COKE AND TAR REMOVAL FROM A FURNACE EFFLUENT

CROSS-REFERENCE TO RELATED APPLICATIONS

This application is a US national phase application of PCT Application Serial No. PCT/US2020/018092 having a filing date of Feb. 13, 2020, which claims priority to and the benefit of U.S. Provisional Application No. 62/806,274 having a filing date of Feb. 15, 2019 and European Patent Application No. 19179668.9 having a filing date of Jun. 12, 2019 the disclosures of all of which are incorporated herein by reference in their entireties.

FIELD

The invention generally relates to thermal cracking of hydrocarbons for the production of olefins, and to processes, apparatus, and systems that are useful in the upgrading of effluent from such thermal cracking.

BACKGROUND

When operated in pyrolysis mode, steam cracking furnaces crack hydrocarbon feeds at high temperatures to produce olefins and certain desired co-products. The cracking occurs within furnace tubes, leading to an accumulation of deposits along the walls of the tubes that impairs heat transfer and hydraulics. The deposits typically comprises coke and/or coke precursors such as tar. Accumulated deposits are typically removed periodically by switching the furnace from pyrolysis mode to decoking mode. After removing a sufficient amount of accumulated deposits, the furnace can be returned to pyrolysis mode operation. During decoking mode, a decking fluid comprising air (typically a combination of steam and air) is substituted for the hydrocarbon feed utilized during pyrolysis mode. Since the presence of un-combusted air in the furnace effluent could lead to uncontrolled reactions with the effluent's hydrocarbons, switching a furnace from pyrolysis mode to decoking mode therefore entails isolating and clearing hydrocarbon from the furnace before the start of decoking mode. In other words, this form of decoking mode is carried out with the furnace "off-stream" with respect to the production of desired olefins and co-products, and is often called "off-stream" decoking. Although effective for deposit removal, off-stream decoking results in a loss of olefin (and desired co-product) production for the furnace for the duration of decoking mode operation.

In another form of decoking mode, the decoking is carried out in certain furnace tubes (the decoking tubes) while other tubes in the same furnace remain in pyrolysis mode operation (the pyrolysis tubes). This form of decoking, often called "on-stream" decoking, removes deposits such as coke using a decoking fluid that does not contain air, but instead comprises water and sometimes lower pressure steam without water. Since un-combusted air is not present in the furnace effluent during on-stream decoking, this form of decoking mode does not require isolation or removal of the hydrocarbon from the entire furnace. Moreover, since only a portion of the furnace tubes are decoked during on-stream decoking, this form of decoking mode result in less lost production, less energy usage, and fewer emissions as compared to off-stream decoking mode using a decoking fluid that includes air.

During pyrolysis mode, furnace effluent is conducted to one or more treatment and/or separation stages for recovery and removal of desired products and co-products, e.g., for recovery of ethylene and propylene. During on-stream decoking, decoking effluent from the decoking tubes is combined with pyrolysis effluent from the pyrolysis tubes. Doing so, however, results in discharging coke and other products of decoking into one or more of the treatment and separation stages, e.g., into water quench towers or fractionators. Coke can impair operation of these downstream fractionation units. For example, the coke can impair separation, restrict piping and/or equipment, and/or erode piping and/or equipment. These issues that the coke cause can be exacerbated when combined with tar in a water quench tower system. When coke and tar are present in a water quench tower, several variable and unpredictable issues with phase separation and coke particle surface tension can exist.

There is need, therefore, for improved processes and apparatus for the removal of coke and tar from steam cracking furnace effluents.

SUMMARY

Certain aspects of the invention relate to removing deposits e.g., those in the form of particulates, from a steam cracker furnace effluent ("furnace effluent"). Accordingly, certain aspects of the invention relate to a process which can include removing coke, tar, and mixtures thereof from furnace effluent, e.g., a furnace effluent conducted away from a furnace wherein a group of the furnace's furnace tubes are operating in pyrolysis mode and a second group of the furnace's furnace tubes are operating in on-stream decoking mode.

In these and other aspects, solids (e.g., coke) and/or semi-solids (including heavy viscous liquids such as tar) are removed from furnace effluent, e.g., from a furnace operating all furnace tubes in pyrolysis mode, all furnace tubes in on-stream decoking mode, or some furnace tubes in pyrolysis mode with at least a portion of the remainder of the furnace tubes being in on-stream decoking mode or some other mode (e.g., a mode for switching from pyrolysis mode to decoking mode, and vice versa). The process can include contacting the furnace effluent (which includes the coke and/or tar) with a first quench liquid to produce a quenched mixture. The first quench liquid can include a first steam cracker naphtha, a first steam cracker gas oil, a first steam cracker quench oil, and a mixtures thereof. The quenched mixture can be introduced into a first inlet of a centrifugal separator drum. A vapor product and a centrifugal separator drum bottoms can be separated from the quenched mixture, wherein the centrifugal separator drum bottoms can include at least a portion of the coke, tar, and the mixture thereof. The centrifugal separator drum bottoms can be recovered from a first outlet of the centrifugal separator drum.

The invention is based in part on the development of a process for conducting away in the bottoms stream a majority of the solids and semi-solids (for brevity, "solids") contained in the furnace effluent. The process is robust in that, as compared to prior art processes, the bottoms stream can be efficiently conducted away even as the amount of solids in the furnace effluent varies, e.g., as when a lesser amount of solids is present in the furnace effluent when fewer furnace tubes are operating in on-stream decoking mode, or as when a greater amount of solids is present in the furnace effluent when the number of furnace tubes operating in on-stream decoking mode increases. One advantage of the process resides in that instead of requiring a complex and expensive reconfiguration of equipment downstream of the steam cracker furnace in response to a change in the number of furnace tubes undergoing on-stream decoking, a much simpler operation can be carried out: increasing or decreasing the amount of quench and/or recycle material introduced into the separator as a greater or lesser number of furnace tubes are operated in on-stream decoking mode.

Certain aspects of the invention utilize a second quench liquid. In these aspects, the first quench liquid can include a first steam cracker naphtha, a first steam cracker gas oil, a first steam cracker quench oil, or a mixture thereof. The quenched mixture can be introduced into a first inlet of a centrifugal separator drum. The second quench liquid can include a second steam cracker naphtha, a second steam cracker gas oil, a second steam cracker quench oil, or a mixture thereof can be introduced into a second inlet of the centrifugal separator drum at a second quench liquid flow rate, wherein the centrifugal separator drum contains the quenched mixture. A vapor product and a centrifugal drum bottoms can be separated from the combined quenched mixture and the second quench liquid, wherein the centrifugal drum bottoms can include at least a portion of the coke, tar, or the mixture thereof. The centrifugal drum bottoms can be recovered from a first outlet of the centrifugal separator drum. A recycle fluid can be introduced tangentially onto a frustoconical inner wall of the centrifugal separator drum through a recycle fluid inlet of the centrifugal separator drum, wherein the recycle fluid can include at least a portion of the centrifugal separator drum bottoms. A centrifugal separator drum bottoms flow rate between the first outlet and the recycle fluid inlet can be measured, and the flow rate of the second quench liquid can be increased when the centrifugal separator drum bottoms flow rate is ≤90% of maximum recycle rate with clean bottoms material recycled.

Other aspects of the invention can also relate to apparatus for upgrading a steam cracker furnace effluent that contains both pyrolysis products and decoking products. Such apparatus can include a separator, a first outlet, a second outlet, a first inlet, a second inlet, a recycle fluid inlet, a first flow meter, and a recycle fluid flow meter. The separator can have an internal volume and include a separation section having a cylindrical inner wall disposed toward a first end of the separator and a discharge section having a frustoconical inner wall disposed toward a second end of the separator, wherein the frustoconical inner wall has an angle of about 45° to about 80° with respect to a base of the frustoconical inner wall. The first outlet, the second outlet, the first inlet, the second inlet, and the recycle fluid inlet can be in fluid communication with the internal volume, wherein the first outlet and the first inlet are disposed toward the first end of the separator, the second inlet and the second outlet are disposed toward the second end of the separator, and the recycle fluid inlet is disposed on the frustoconical inner wall. The first flow meter can be in fluid communication with the second inlet and configured to measure a first flow rate. The recycle fluid flow meter can be in fluid communication with the recycle fluid inlet and configured to measure a recycle fluid flow rate.

The foregoing aspects and other aspects can relate to removing coke, tar, or a mixture thereof from a furnace effluent. The furnace effluent can be contacted with a first quench liquid to produce a quenched mixture, wherein the first quench liquid can include a first steam cracker naphtha, a first steam cracker gas oil, a first steam cracker quench oil, or a mixture thereof and the furnace effluent can be at temperature of about 180° C. to 400° C. and the first quench liquid can be at a temperature of about 30° C. to 200° C. when the furnace effluent is contacted with the first quench liquid. The quenched mixture can be introduced into a first inlet of a centrifugal separator drum. A second quench liquid can include a second steam cracker naphtha, a second steam cracker gas oil, a second steam cracker quench oil, or a mixture thereof can be introduced into a second inlet of the centrifugal separator drum at a second quench liquid flow rate, wherein the centrifugal separator drum contains the quenched mixture. A vapor product and a centrifugal drum bottoms can be separated from the quenched mixture and the second quench liquid, wherein the centrifugal drum bottoms can include at least a portion of the coke, tar, or the mixture thereof. The centrifugal drum bottoms can be recovered from a first outlet of the centrifugal separator drum. A recycle fluid can be introduced tangentially onto a frustoconical inner wall of the centrifugal separator drum through a recycle fluid inlet of the centrifugal separator drum, wherein the recycle fluid comprises at least a portion of the centrifugal separator drum bottoms. A centrifugal separator drum bottoms flow rate between the first outlet and the recycle fluid inlet can be measured, and the flow rate of the second quench liquid can be increased when the centrifugal separator drum bottoms flow rate is ≤90% of maximum recycle rate with clean bottoms material recycled. In these and other aspects in which include introducing a second quench liquid and/or a recycle of the bottoms stream into the centrifugal separator, the introduction of one or both of these streams can be configured to flux solids moving downward in the separator but without appreciably changing the temperature of the downwardly-moving solids.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
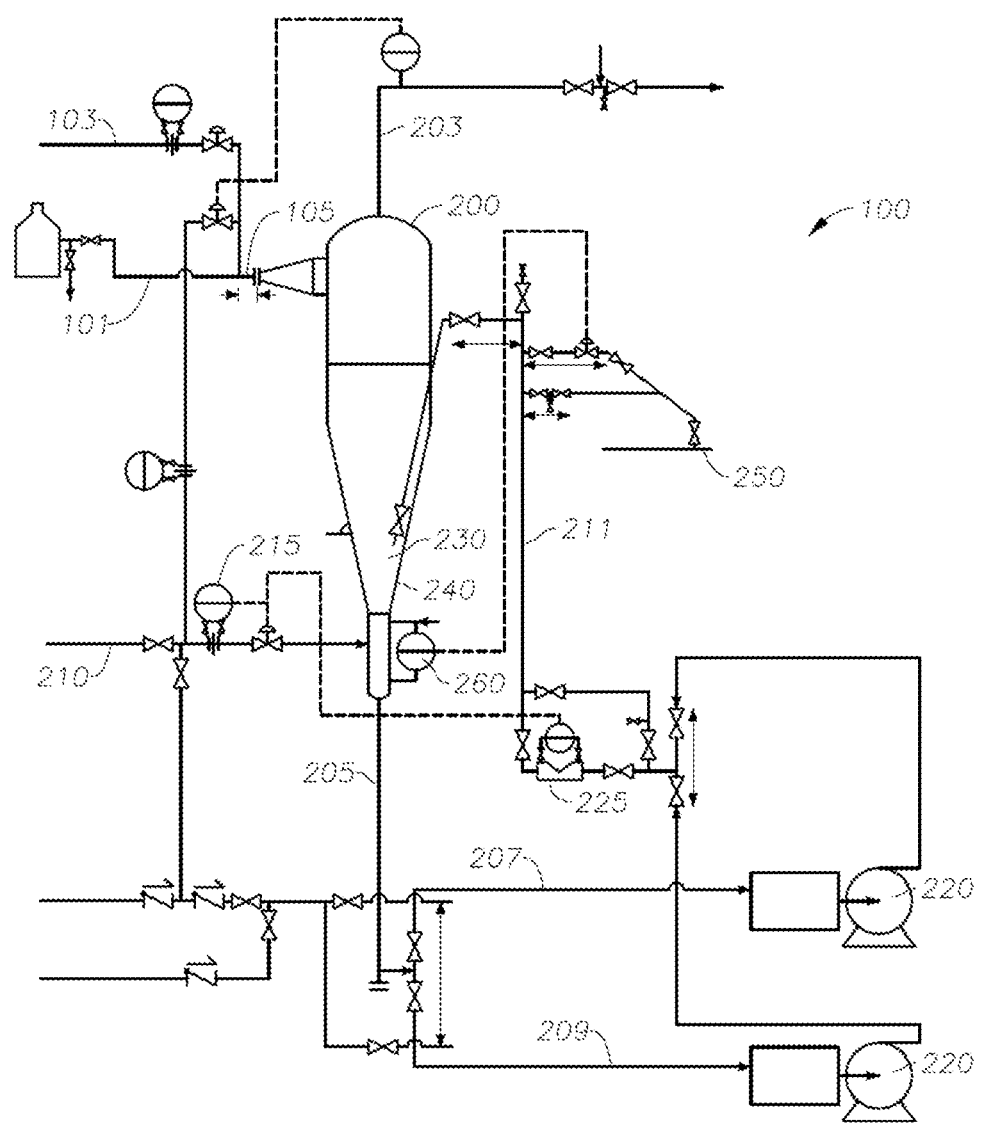
FIG. 1 is a schematic flow diagram of a process for coke and tar removal from a steam cracker effluent, according to one or more embodiments described.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein, e.g., for features performing a similar function in each figure. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Definitions

As used herein, the term "Steam cracker naphtha" or "SCN" refers to the molecules present in a steam cracker effluent boiling in the naphtha boiling range. For example, a mixture of compounds (including olefins) having ≥75.0 wt. % of molecules containing hydrogen and carbon, with not less than 10.0 wt. % of which mixture having an atmospheric boiling point<175° C. and not less than 95.0 wt. % of which mixture having an atmospheric boiling point≤260° C., wherein the boiling ranges are measured in accordance with ASTM Standard D86 and the weight percents are based on the weight of the mixture.

As used herein, the term "Steam cracker gas oil" or "SCGO" refers to the effluent fraction from a hydrocarbon pyrolysis process that is a liquid, hydrocarbon-containing distillate, wherein more than 5.0 wt. % of the distillate has an atmospheric boiling point>260° C., the boiling range being measured in accordance with ASTM Standard D86, and the weight percent being based on the weight of the distillate.

As used herein, "wt. %" means percentage by weight. All ranges expressed herein should include both end points unless specified or indicated to the contrary.

In some examples, deposits such as coke and coke precursors (collectively "coke"), tar, or a mixture thereof can be removed from a furnace effluent by contacting the furnace effluent containing coke, tar, or a mixture thereof with a first quench liquid to produce a quenched mixture, wherein the first quench liquid can contain steam cracker naphtha, steam cracker gas oil, a first steam cracker quench oil, or a mixture thereof. The first quench liquid can be non-aqueous, where the term "non-aqueous quench liquid" means one containing ≤1 wt. % of water, e.g., ≤0.1 wt. %, such as ≤0.01 wt. %, or ≤0.001 wt. %, or less. The quenched mixture can be introduced into a centrifugal separator drum. Using a non-aqueous quench liquid as the first (and/or second) lessens the effect of several phase separation difficulties if an aqueous quench liquid were used, e.g., unpredictable phase specific gravity and an increase in coke particle surface tension. A product that is primarily in the vapor phase (the "vapor product") and a centrifugal drum bottoms can be separated from the quenched mixture, wherein the centrifugal separator drum bottoms comprises at least a portion of the coke, tar, or the mixture thereof. As used in this instance, the term "primarily in the vapor phase" means that ≥90 wt. % of the vapor product is in the vapor phase, with ≤10 wt. % being in the liquid phase and/or solid phase, e.g., ≤5 wt. %, or ≤1 wt. %, or ≤0.1 wt. %. The centrifugal separator drum bottoms can be recovered from the centrifugal separator drum.

Considering the heterogeneous nature of a furnace effluent comprising decoke effluent and pyrolysis effluent, as is the case when at least a portion of the furnace tubes are undergoing on-stream decoking, it has been surprisingly and unexpectedly discovered that coke and/or tar can be removed from such a furnace effluent using one or more centrifugal separator drums. The removal of the coke and/or tar from the furnace effluent or a portion thereof during on-stream decoking can reduce or prevent fouling within downstream equipment, e.g., water quench systems and/or oil fractionators.

In some examples, a second quench liquid containing steam cracker naphtha, steam cracker gas oil, steam cracker quench oil, or a mixture thereof can be introduced into the centrifugal separator drum containing the quenched mixture. Since doing so would be expected to further increase the heterogeneous nature of the furnace effluent, it is surprising and unexpected that the introduction of a second quench liquid into the centrifugal separator drum can reduce the entrainment of the tar and/or coke in the stream conducted away as separator drum overhead. Controlling the composition of the liquid in a liquid/vapor separation through the addition of a second quench liquid surprisingly allows for manipulation of the coke and tar bottoms entrained in the outlet. The first and/or second quench liquid can be non-aqueous quench liquids. Although the term "quench liquid" is used, those skilled in the art will appreciate that the quench liquid need not be entirely in the liquid phase. For example, it is within the scope of the invention for the quench liquid to contain in addition to liquid phase material at least some vapor-phase material and/or at least some solid-phase material. For example, in certain quench liquids≥75 wt. % of the quench liquid is in the liquid phase, e.g., ≥90 wt. %, such as ≥95 wt. %, or ≥99 wt. %. In aspects where the quench liquid contains little or no solids, the quench liquid can be called a quench fluid. The second quench fluid can have substantially the same composition as the first quench fluid, but this is not required.

In some examples, the furnace effluent can be produced in a steam cracking process. Such a steam cracking process can utilizes a hydrocarbon feed that contains ≥50 wt. % of hydrocarbon, based on the weight of the hydrocarbon feed. In some examples, the hydrocarbon feed can contain ≥50 wt. %, e.g., ≥75 wt. %, such as ≥90 wt. % of naphtha and/or alkanes (including isoalkanes, cycloalkanes, etc.) having a number of carbon atoms of 2 to 6, e.g., 2 to 4. In other examples, the hydrocarbon feed can contain about 20 wt. % to 80 wt. % of ethane and about 80 wt. % to about 20 wt. % of propane, based on the weight of the hydrocarbon feed. In other examples, the hydrocarbon feed can contain about 0 wt. % to 100 wt. % of ethane and about 0 wt. % to about 100 wt. % of propane, based on the weight of the hydrocarbon feed. In some examples, the hydrocarbon feed can contain a mixture of $C_2$ to $C_6$ molecules. In some examples, the hydrocarbon feed can be a recycle stream from a liquid cracking process and/or a fresh feed stream from a natural gas field. Feeds derived from one or more of these, e.g., by way of additional treatments and/or separations, are within the scope of the invention.

The invention is not limited to hydrocarbon feeds that are primarily vapor phase at 1 bar (absolute) pressure and a temperature of 25° C. For example, in certain aspects the hydrocarbon feed includes one or more of gas oil, vacuum gas oil, crude oil, resid, or resid admixtures; including those including ≥about 0.1 wt. % asphaltenes. Suitable crude oils include, e.g., high-sulfur virgin crude oils, such as those rich in polycyclic aromatics. When the feed to the stream cracker furnace comprises one or more of such heavy feeds, it is typical for the furnace effluent to undergo one or more initial separations upstream of primary fractionator or quench tower, e.g., to remove steam cracker tar, even when on-stream decoking is not used. See, e.g., the tar knock out drum disclosed in P.C.T. Patent Application Publication No. WO 2018/111573. When on-stream decoking is used, such a knock out drum would be expected to remove at least a portion of the coke and tar present in the decoking effluent, and consequently, in the furnace effluent too. However, when it is desired to omit a tar knock out drum from the steam cracking process and/or when an increased amount of coke and tar separation is desired over what a tar knock out drum can achieve, the processes, apparatus, and systems of the invention can be used as an addition or alternative separation when processing such heavy feeds.

During pyrolysis mode, the hydrocarbon feed can be combined with a diluent before pyrolysis to produce a diluent-feed mixture. The diluent-feed mixture is heated in the furnace's convection section, and the heated feed-diluent mixture is introduced into furnace tubes (also called radiant tubes or radiant coils) operating under pyrolysis mode conditions. For example, the diluent can include, e.g., ≥95 wt. % of water based on the weight of the diluent. In some examples, the hydrocarbon feed and diluent can be combined to provide an amount of diluent that is ≥1 wt. % of diluent based on the weight of the diluent-feed mixture, such as ≥25 wt. %. In pyrolysis mode, the diluent-feed mixture can be produced by combining the feed with steam, e.g., at a ratio of about 0.2 to about 4 kg steam per kg hydrocarbon in the hydrocarbon feed. In some examples, the hydrocarbon feed can include ≥95 wt. % of hydrocarbon, and the amount of steam is in the range of about 0.4 kg of steam per kg of hydrocarbon feed to 0.6 kg of steam per kg of hydrocarbon feed. In some examples, the amounts of hydrocarbon feed and diluent can be increased to increase the amount of process stream, but the relative amount of steam (kg of steam divided by kg of hydrocarbon feed) is substantially constant, e.g., the final value of (kg of steam divided by kg of feed) is within +/−5% of the initial value, e.g., within about +/−1% of the initial value of (kg of steam divided by kg of hydrocarbon feed).

In some examples, the hydrocarbon feed can be conducted to a steam cracker furnace having at least two main sections: a convection section and a radiant section. The hydrocarbon feed enters the convection section of the furnace where it can be heated and at least partially vaporized, e.g., by indirect contact with hot flue gas from the radiant section and/or by direct contact with the diluent, which can be added to the hydrocarbon feed to produce the feed-diluent mixture.

Optionally, particularly when a heavy feed such as a resid-containing feed is used, the steam cracker furnace can be integrated with at least one vapor/liquid separation device (conventionally referred to as a flash pot or a flash drum), for upgrading the steam cracker feed or the feed-diluent mixture. Such vapor/liquid separator devices can be suitable when the hydrocarbon feed comprises ≥about 0.1 wt. % of asphaltenes based on the weight of the hydrocarbon feed, e.g., ≥about 5.0 wt. %. Conventional vapor/liquid separation devices can be utilized to do this, but the invention is not limited thereto. Examples of such conventional vapor/liquid separation devices include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; and 7,235,705. Suitable vapor/liquid separation devices are also disclosed in U.S. Pat. Nos. 6,632,351 and 7,578,929. Generally, when using a vapor/liquid separation device, the composition of the vapor phase leaving the device can be substantially the same as the composition of the vapor phase entering the device, and likewise the composition of the liquid phase leaving the flash drum can be substantially the same as the composition of the liquid phase entering the device. The separation in the vapor/liquid separation device can be a physical separation of the two phases entering the drum.

During pyrolysis mode, the feed-diluent mixture can be conducted from the convection section to the radiant section, where at least a portion of the feed is exposed to a temperature of >400° C. in order to convert at least a portion of the mixture's hydrocarbon molecules by pyrolysis. Optionally, the feed-diluent mixture can be conducted to the radiant section via crossover piping. Suitable pyrolysis conditions in the radiant section include, e.g., exposing the feed-diluent mixture to a temperature (measured at the radiant outlet) >400° C., e.g., in the range of 400° C. to 900° C., and a pressure >0.1 bar (absolute), for a residence time in the range of from about 0.01 seconds to 5.0 seconds. For example, the steam cracking conditions can include one or more of (i) a temperature ≥760° C. (e.g., in the range of 760° C. to 880° C.); (ii) a pressure >0.5 bar (absolute (e.g., about 1 to about 5 bar (absolute)), or (iii) a residence time of about 0.1 to about 2 seconds.

During on-stream decoking, the decoking is carried out in certain furnace tubes (the decoking tubes, in which no hydrocarbon feed is present) while other tubes in the same furnace remain in pyrolysis mode operation (the pyrolysis tubes). This form of decoking removes deposits such as coke using a decoking fluid that does not contain air, but instead comprises water and sometimes lower pressure steam without water. It can be desirable to calibrate the mass flow rate and/or the velocity of bottoms returned to the separator drum as recycle during an interval when no furnace tubes are undergoing decoking. During that interval, the bottoms (including that portion of the bottoms that is recycled to the separator drum) can be considered to be "clean", as the amount of solids in the drum bottoms much less than the amount present when at least some of the furnace tubes are operated in on-stream decoking mode. Since little if any solids are present in the clean bottoms, difficulties that would otherwise be encountered when conducting away and/or recycling a solids-laden bottoms are not encountered. As the amount of solids in the separator drum bottoms increases, these difficulties include (i) the amount of separator drum bottoms that can be recycled decreases and (ii) the velocity of bottoms recycled to the separator decreases. Accordingly, certain aspects of the invention include establishing a maximum separator recycle mass flow rate and/or a maximum separator recycle velocity during an interval when the separator drum bottoms is clean (i.e., when no furnace tubes are operating in on-stream decoking mode). In these and other aspects, the flow rate of the second quench liquid can be adjusted (or otherwise regulated) in response to a decrease or increase in the mass flow rate and/or velocity of bottoms recycled to the separator drum, particularly when at least some furnace tubes are operating in on-stream decoking mode. For example, the mass flow rate of the second quench liquid can be increased when the mass flow rate and/or velocity of the recycled bottoms introduced into the separator drum is ≤95% of a predetermined maximum mass flow rate of the recycle and/or maximum velocity of the recycle when the bottoms material is clean, such as ≤90%, or ≤75%. Said another way, the second quench liquid's flow rate (mass basis) can be adjusted to maintain the mass flow rate and/or the flow velocity of recycle into the centrifugal separator drum in a predetermined range of from 70% of the maximum recycle mass flow rate and/or velocity with clean bottoms material to 95%, e.g., from 90% to 99%, such as from 90% to 95%. In these and other aspects, the second quench liquid flow rate can be regulated (or otherwise adjusted) to maintain a solids content of ≤0.9 wt. % in the centrifugal separator drum bottoms, e.g., ≤0.8 wt. %, such as ≤0.7 wt. %, or ≤0.5 wt. %, or in a range of from 0.1 wt. % to 0.9 wt. %.

The effluent or furnace effluent produced in the radiant section can be conducted away, and generally can contain, e.g., gas oil, naphtha, tail gas, ethane, propane, ethylene, propylene, benzene, crude $C_4$ hydrocarbons, molecular hydrogen, coke (albeit the coke amount increases during on-stream decoking), acetylene, acidic gases such as $H_2S$ and/or $CO_2$, mercaptans, mixtures of gasoline boiling-range hydrocarbons (which can be upgraded to produce motor gasoline), tar products, and unconverted components of the feed-diluent mixture, such as unconverted steam. The furnace effluent can be quenched, e.g., by combining the furnace effluent with quench liquid to produce a process stream having a temperature less than that of the furnace effluent, the process stream can include a liquid phase and a vapor phase. Before the first quench liquid is introduced, the furnace effluent contains material in the liquid phase in an amount in the range of from 0 wt. % to 60 wt. %, such as from 0 wt. % to 40 wt. %, or 0 wt. % to 30 wt. %. After the first quench liquid is introduced, the furnace effluent contains material in the liquid phase in an amount in the range of from 0.001 wt. % to 60 wt. %, such as from 0.001 wt. % to 40 wt. %, or 0.001 wt. % to 30 wt. %.

FIG. 1 depicts a schematic of an illustrative system 100 for removing coke, tar, or a mixture thereof from a steam cracker furnace effluent, as may occur during pyrolysis mode and to a greater extent when at least a portion of the steam cracker furnace tubes are operating in on-stream decoking mode. The furnace effluent containing coke, tar, or a mixture thereof via line 101 and a first quench liquid via line 103 can be mixed, blended, combined, or otherwise contacted to produce a quenched mixture via line 105. The first quench liquid can contain steam cracker naphtha, steam cracker gas oil, steam cracker quench oil, or a mixture thereof. In some examples, in lieu of or in addition to using the steam cracker naphtha, steam cracker gas oil, steam cracker quench oil, or a mixture thereof, one or more utility fluid products can be used. Suitable utility fluid products can include those disclosed in U.S. Pat. Nos. 9,090,836; 9,637,694; and 9,777,227; and International Patent Application Publication No. WO 2018/111574.

The quenched mixture can include about 10 wt. % to about 95 wt. % of the quench liquid based on a combined weight of the furnace effluent and the quench liquid. In some examples, the steam cracker effluent in line 101 can be at a temperature of ≥300° C., ≥400° C., ≥500° C., ≥600° C., or ≥700° C., or ≥800° C., or more. In certain aspects, the temperature of the steam cracker effluent in line 101 can be in the range of about 425° C. to 850° C., e.g., about 450° C. to about 800° C., when initially contacted with the quench liquid. In some examples, the quench liquid in line 103 can be at a temperature of ≤200° C., ≤175° C., ≤150° C., ≤100° C., or ≤50° C., or ≤30° C., or less. In certain aspects, the temperature of the quench liquid in line 103 can be in the range of about 100° C. to 200° C., e.g., about 135° C. to about 200° C., when initially contacted with the furnace effluent. In some examples, the first quench liquid can be a liquid, a gas, or a mixture of liquid and gas prior to contacting the furnace effluent. In some examples, at least a portion of the first quench liquid can vaporize upon contacting the furnace effluent. In some examples, a portion of the vaporized quench liquid can contain steam cracker naphtha.

The quenched mixture can be introduced into a centrifugal drum separator 200 via line 105. A vapor phase product can be separated from the centrifugal drum separator 200 via line 203. The vapor phase product can contain a reduced amount of coke, tar, and mixtures thereof and can be introduced into one or more fractionators, knockout drums, a combined quench tower and primary fractionator, a compressor, contaminant removal units, e.g., $CO_2$ and/or $H_2S$ removal units, acetylene converter, etc. In some examples, the products that can be separated from the vapor phase product can be separated according to the processes and systems disclosed in U.S. Patent Application Publication No. 2014/0357923. A primarily liquid-phase mixture product ("centrifugal separator drum bottoms") containing at least a portion of the coke, tar, and mixtures thereof can be separated from the centrifugal drum separator 200 via line 205. A portion of the centrifugal separator drum bottoms in line 205 can be recycled to the centrifugal drum separator 200 using at least one pump 220. Split lines 207 and 209 can be used to facilitate the transport of solids (e.g., by flushing) in the centrifugal drum bottoms. The split lines 207 and 209 can rejoin to form line 211 just before the vertically-oriented line 211 (upwardly-oriented flow, e.g., in an up-leg) to the recycle fluid inlet 230. The flow rate of the centrifugal separator drum bottoms in line 211 can be measured using flow meter 225, e.g., a wedge flow meter. A portion of the centrifugal separator drum bottoms from line 211 can be recycled to the centrifugal drum separator 200 through a recycle fluid inlet 230. In some examples, the recycle fluid inlet 230 can be a tangential inlet along an angled wall 240 of the centrifugal drum separator 200. Doing so has been observed to decrease separator drum erosion from solids in the drum. Moreover, it has been surprisingly and unexpectedly discovered that introducing at least a portion of the recycled centrifugal separator drum bottoms along the angled wall 240 of the centrifugal drum separator 200 can enhance the liquid/vapor separation.

A second quench liquid can be introduced into from the centrifugal drum separator 200 via line 210. A flow meter 215 can measure the flow rate of the second quench liquid into the centrifugal drum separator 200. Additionally, the flow rate of the second quench liquid can be increased when the centrifugal separator drum bottoms flow rate is ≤70%, ≤75%, ≤80%, ≤85%, or ≤90% of maximum rates. The flow rate of the centrifugal drum bottoms can decrease as additional coke or tar particles accumulate in lines 205, 207, 209, and 211, especially as additional coke and tar particles are introduced into the centrifugal drum separator 200, e.g., during on-stream decoking of a furnace. Additional quench liquid can be used to maintain a solids content in the centrifugal separator drum bottoms of ≤2 wt. %, ≤1 wt. %, ≤0.9 wt. %, ≤0.8 wt. %, ≤0.7 wt. %, or ≤0.6 wt. % or in the range of about 0.2 wt. % to about 2 wt. %, or about 0.4 wt. % to about 0.9 wt. %; the weight percent values being based on a weight of the centrifugal separator drum bottoms.

Certain aspects include a control system, e.g., an automated control system such as one under the control of a computer and/or automated process control equipment. The control system can be used to maintain a predetermined dilution of solids (such as coke particles and tar) in the separator drum bottoms during variations in the amount of these solids in the furnace effluent. Such variations may occur, e.g., when one or more furnace tubes is brought into on-stream decoking mode, which can result in coke spalling in the furnace tubes undergoing decoking. For example, the amount of solids in the flow (e.g., particulate loading and density) can be monitored by the mass flow rate and/or velocity of the recycle returned to the separator drum via inlet 230. The mass flow rate and/or velocity can be measured by a wedge flow meter 225 positioned proximate to the base of the separator drum before an upwardly-oriented return-line 211. The upwardly-oriented segment of line 211 is typically of a length comparable to the height of the separator drum (as measured along a conceptual vertical line between the inlet of line 210 into the separator drum 200 and inlet 105. In certain aspects, the length of the upwardly-oriented segment of line 211 is in the range of from about 0.5 times the height of the separator drum to about 2 times the height of the separator drum, e.g., about 0.75 times to 1.25 times. As the content of solids in the separator drum bottoms increases, solids (typically in the form of particulates) will accumulate in line 211, leading to additional frictional pressure drop and static head. These in turn can increase the amount of pump discharge head, and restrict pump flow rates of pumps 220. When the flow rate as measured by flow meter 225 declines below a predetermined threshold, the control system causes an additional injection of second quench liquid via line 210 into separator drum 220 (e.g., at a location proximate to the boot of the separator drum 200) by signaling the combination of flow meter and control valve 215 shown in FIG. 1. Similarly, concentrating tar in the flow of line 211 will increase density, viscosity, and static head, resulting in increased pump discharge head, reduced flow velocity. In certain aspects such an event can be mitigated by initiating or increasing the injection of the second quench liquid into the separator drum. This can be carried out automatically, e.g., via the automatic control system, resulting in an automatic dilution of the tar in from the drum bottoms. Pump 220 impeller erosion can also result in reduced flows, which the automated control system can address with increased injection of the second quench liquid. Doing so lessens particulate load, which in turn lessens erosion rates. Accordingly, a decrease recirculation flow of recycle liquid to separator drum 200 via inlet 230 can automatically increase the flow of the second quench liquid, which in turn automatically overcomes solids-separation difficulties.

Certain aspects of the invention include injecting a second quench liquid into the boot region of a centrifugal separator drum. Doing so has been found to be advantageous in maintaining some consistent purge through the system. For example, the second quench liquid can combine in the boot with separated tar, coke particles, etc., to produce a bottoms stream. In these and other aspects, at least a portion of the bottoms stream can be returned to the separator drum as recycle via a bottoms circuit. Typically, the introduction of a second quench liquid and/or a recycle portion of the bottoms stream as shown in FIG. 1 fluxes solids moving downward in the centrifugal separator drum but without appreciably changing the temperature of the downwardly-moving solids. For example, the downwardly-moving solids in the centrifugal separator drum may exhibit a temperature $T_1$ at a location immediately above inlet 230, and a temperature $T_2$ at the separator drum outlet for removing bottoms stream 205. Temperature difference $T_1-T_2$ is typically ≤200° C., e.g., ≤100° C., such as ≤50° C., or ≤25° C., or ≤10° C., or ≤5° C. In certain aspects, $T_1-T_2$ is in a range of from −10° C. (i.e., a slight warming can occur) to 50° C., such as 1° C. to 25° C., or 5° C. to 25° C.

Typically, the bottoms circuit includes piping configured for the indicated recycle and for conducting away at least another portion of the bottoms stream for storage and/or further processing. A representative configuration of a bottoms circuit, shown in FIG. 1, has been observed to decrease (or even minimize erosion while at the same time facilitating clearing and maintenance of individual pumps and pump strainers. Although other bottoms circuit configurations are within the scope of the invention, the bottoms circuit of FIG. 1 advantageously routes oil, tar, and coke particles through one or more pumps designed to maintain a consistent bottoms flow rate for dilution and suspension of coke particles, even in significant spalling events (e.g. unplanned decoking upsets). A bottoms circuit typically achieves a flow of recycle through its inlet into the separator drum at a velocity of from 0.1 m/s to 10 m/s, e.g., 0.25 m/s to 5 m/s, such as 0.5 m/s to 3 m/s. It has been observed for a wide range of on-stream decoking configurations a velocity in the range of 0.5 m/s to 3 m/s typically achieves a favorable balance of (i) decreased particulate settling and (ii) decreased erosion in the separator drum.

In some examples, the second quench liquid can be liquid, gas, or a mixture of liquid and gas prior to be introduced into the centrifugal drum separator 200. In some examples, ≥90 wt. %, ≥95 wt. %, ≥98 wt. %, or ≥99 wt. % of the second quench liquid can be a liquid based on the weight of the second quench liquid. In some examples, the second quench liquid can be or include, but is not limited to, steam cracker naphtha, steam cracker gas oil, steam cracker quench oil, or a mixture thereof.

In some examples, the first quench liquid, second quench liquid, and centrifugal separator drum bottoms each can be non-aqueous, e.g., each can comprise ≤1 wt. %, ≤0.5 wt. %, ≤0.25 wt. %, or ≤0.1 wt. % of water based on the weight of the first quench liquid, second quench liquid, or bottoms flow, respectively.

In some examples, coke, tar, and mixtures thereof can be removed from the centrifugal separator drum bottoms using a tar and coke discharge system 250. A portion of the centrifugal separator drum bottoms can be redirected from line 211 to the tar and coke discharge system 250. In some examples, the tar and coke discharge system 250 can contain a fractionator with a flash zone separator at the bottom and tar filters to separate tar and coke and remove coke manually. In some examples, the tar and coke discharge system 250 can include a set of tanks for settling and disposal. In some examples, the tar and coke discharge system 250 can include a filter system. Additionally, a level control 260 can indicate the need to remove excess centrifugal separator drum bottoms. When pump 220 discharge rates decline, indicating heavy solids loading, additional fresh quench liquid can be pumped into the a location proximate to the boot of centrifugal drum separator 200 via control valve and flow meter 215. As a result, the level increases, and then the discharge control valve on line 211 can remove fluid from the system to replace heavily fouled recycle with fresh quench liquid.

Figure 2:
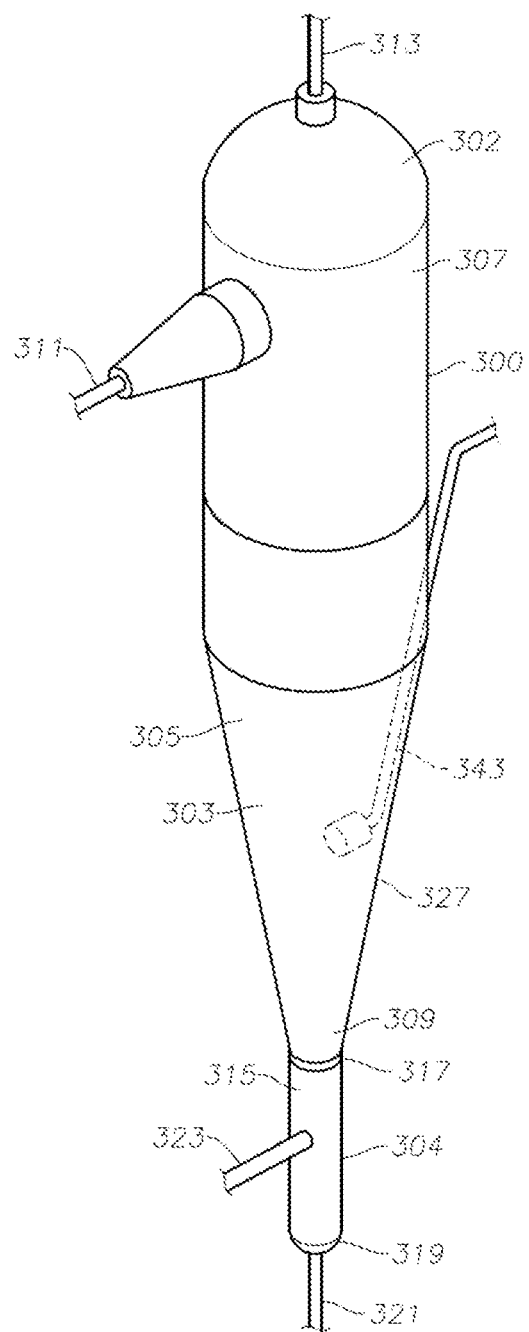
FIG. 2 depicts an isometric view of an illustrative centrifugal drum separator.

FIG. 2 depicts an isometric view of an illustrative centrifugal drum separator 300. The centrifugal drum separator 300 can include a first end or "top" 302, a second end or "bottom" 304, a first or "separation" section 305 and a second or "discharge" section 315. The separation section 305 can have a first end or "top" 307, a second end or "bottom" 309, one or more inlets (one is shown 311) and one or more outlets (one is shown 313) in fluid communication with the internal volume 303. The one or more inlets 311 can be disposed between the top end 307 and the bottom end 309, about the top end 307, or a combination thereof. The one or more outlets 313 can be disposed about the top end 307, between the top end 307 and the bottom end 309, or a combination thereof. As used herein, the terms "top" and "bottom," "front" and "rear," "left" and "right," and other like terms are merely used for convenience to refer to spatial orientations or spatial relationships relative to one another with respect to the separator 300 when viewed from the direction shown in FIG. 2.

The discharge section 315 can have a first end or "top" 317 and a second end or "bottom" 319. The top 317 can be connected to the bottom 309 of the separation section 305. The discharge section 315 can also include one or more outlets (one is shown 321) and one or more inlets (one is shown 323) in fluid communication with the internal volume 303. The one or more outlets 321 can be disposed between the top 317 and the bottom 319, about the bottom 319, or a combination thereof. The one or more inlets 323 can be disposed between the top 317 and the bottom 319, about the bottom 319, or a combination thereof. In some examples, at least one of the one or more inlets 323 can be disposed between the one or more inlets 311 and the bottom 319 of the discharge section 315.

In some examples, the separator 300 can include one or more recycle fluid inlets 343 and can be or include one or more opening or ports disposed through a wall of the discharge section 315. In some examples, the recycle fluid inlet 343 can be tangential to the wall of the discharge section 315.

The cross-sectional shape of the one or more fluid inlets 311, 323, the one or more recycle inlets 343 and the one or more outlets 313, 321 can be any suitable geometrical shape. If the separator 300 includes a plurality of fluid inlets 311, 323 for example, the cross-sectional shape of any two of the inlets 311, 323 and the openings associated therewith can be the same or different with respect to one another. Illustrative cross-sectional shapes can include, but are not limited to, circular, oval, elliptical, triangular, rectangular, any other polygon having three or more sides, any other shape having curved sides or any other geometrical shape having any combination of curved and straight sides.

Any number of inlets, e.g., the inlets 311, 323 and/or recycle fluid inlet 343, can be in fluid communication with the internal volume 303. For example, the separator 300 can include from 1 to 100 or more fluid inlets 311, 323 or recycle fluid inlets 343 disposed through a wall of the discharge section 315, a wall of the separation section 305, or a combination thereof.

The separator 300, e.g. the separation section 305, discharge section 315, inlets 311, 323, outlets 313, 321 and/or the recycle fluid inlet 343, can be made from any material or combination of materials having suitable rigidity, strength, and/or other desirable properties. Illustrative materials can include, but are not limited to, metals, metal alloys, polymers or plastics, glasses, fiberglass, or any combination thereof. Preferably the separator 300 can be made from one or more metal or metal alloys such as steel, stainless steel, carbon steel, nickel alloys, and the like.

The cross-sectional shapes of the separation and discharge sections 305, 315 can be any suitable geometrical shape. The cross-sectional shapes of the separation section 305 and the discharge section 315 can be the same or different. Illustrative cross-sectional shapes can include, but are not limited to, circular, oval, elliptical, triangular, rectangular, any other polygon having three or more sides, any other shape having curved sides or any other geometrical shape having any combination of curved and straight sides.

The separation section 305 and/or the discharge section 315 can have constant or variable cross-sections. For example, the cross-section of the separation section 305 can be circular having a constant diameter from the top 307 to the bottom 309 to provide a cylindrical separation section 305 and the cross-section of the discharge section 315 can be circular having a variable diameter from the top 317 to the bottom 319 to provide a conical or frustoconical discharge section 327. In another example, the cross-section of the separation section 305 can be circular having a variable diameter from the top 307 to the bottom 309 to provide a conical or frustoconical separation section 327 and the cross-section of the discharge section 315 can be circular having a variable diameter from the top 317 to the bottom 319 to provide two conical or frustoconical sections opposed to one another. In yet another example, the cross section of the separation section 305 and the discharge section 315 can both be circular with the separation section 305 and the discharge section 315 having the same diameters or different diameters.

In some examples, the angle or slope of an inner wall or surface of a conical or frustoconical separation section 327 can be about 45° to about 80°, with respect to a base of the conical or frustoconical separation section 307. For example, the angle or slope of the conical or frustoconical separation section 327 can be about 45°, about 55°, about 60°, about 65°, about 68°, about 70°, about 72°, or about 75°, with respect to the base of the conical or frustoconical separation section 327. In some examples, the conical or frustoconical separation section 327 can have an angle of about 45°, about 55°, about 60°, about 65°, and about 68° to about 72° or about 80° with respect to a base of the conical or frustoconical separation section 327.

In some examples, the inner surface of the separation section 305, the discharge section 315, or both can be coated with one or more slick or low friction coatings. Illustrative coating material can be or include, for example, polytetrafluoroethylene. Commercially available coating material can include PLASITE® 7122, which is available from CARBOLINE® Company.

The discharge outlet 321 can have any desired cross-sectional shape. The discharge outlet 321 can have any desired cross-sectional area. For example, in at least one example, the ratio of the cross-sectional area of the discharge outlet 321 to the cross-sectional area of the separation section 305 can be about 1:1, about 1:1.5, about 1:2, about 1:2.5, about 1:3, about 1:3.5, about 1:4, about 1:4.5, about 1:5, about 1:5.5, about 1:6, about 1:6.5, about 1:7, about 1:7.5, about 1:8, about 1:8.5, about 1:9, about 1:9.5, or about 1:10.

In some examples, a discharge regulating device, such as a valve, can be disposed on, in, or otherwise be in communication with the inlet 323 to regulate or control the rate at which the quench liquid is introduced into the separator 300. Illustrative discharge regulating devices can include, but are not limited to, rotary airlock valves, table feeders, circle feeders, slide valves, and the like.

In some examples, a flow meter can be in fluid communication with inlet 323. The flow meter can measure the rate at which the quench liquid is introduced into the separator 300. In some examples, the recycle fluid inlet 343 can be in fluid communication with outlet 321. In some examples, a flow meter can be in fluid communication with recycle fluid inlet 343 and outlet 321. A flow meter can measure the rate at which the centrifugal drum bottoms flows through the recycle loop.

The dimensions of the separator 300, e.g. the separation section 305, discharge section 315, inlets 311, 323, 343 and outlets 313, 321 and the number of inlets 311, 323, and 343 and outlets 313, 331 can be based, at least in part, on the particular components of the furnace effluent, the rate at which furnace effluent is introduced via line 311. In some examples, the furnace effluent can be quenched prior to being introduced into separator 300. In some examples, the separator 300 can be constructed to provide an internal volume 303 capable of receiving from about 1 kg/hr to about 500,000 kg/hr or more of the furnace effluent via line 311. In another example, the separator 300 can be constructed to provide an internal volume capable of receiving from a low of about 10 kg/hr, about 1,000 kg/hr, or about 10,000 kg/hr to a high of about 30,000 kg/hr, about 40,000 kg/hr, about 50,000 kg/hr, about 60,000 kg/hr, about 70,000 kg/hr, 150,000 kg/hr, 300,000 kg/hr, or about 500,000 kg/hr of the furnace effluent via line 311. Advantageously, the internal volume of separator 300 is typically much less than that of a conventional separator drum configured to receive a decoking effluent from a steam cracking furnace of substantially the same capacity but operating entirely in pyrolysis mode or decoking mode (i.e., no on-stream decoking). For example, the internal volume of separator 300 is typically ≤0.9 times the internal volume of the conventional separator, e.g., ≤0.75 times, or ≤0.5 times, or ≤0.25 times, or ≤0.1 times the internal volume of the conventional separator. In these and other example, the greatest internal diameter of single-stage separator 300 typically ≤0.9 times the greatest internal diameter of the conventional separator, e.g., ≤0.75 times, or ≤0.5 times, or ≤0.25 times, or ≤0.1.

The separator 300 can be operated at a temperature of about 135° C., about 150° C., or about 165° C., to a about 180° C., about 190° C., or about 200° C. The separator 300 can be operated at a pressure of about 0.1 kPa, about 0.5 kPa, or about 1 kPa to about 1,000 kPa, about 2,000 kPa, or about 3,000 kPa above atmospheric pressure. In some examples, the separator 300 can be operated at a pressure of about 50 Pa, about 150 Pa, or about 300 Pa to about 700 Pa, about 1,000 Pa, or about 2,500 Pa above atmospheric pressure.

The residence time of the furnace effluent introduced via line 311 within the separator 300 can depend on one or more factors. For example, the particular residence time of the furnace effluent can depend on the size of the particulates in the furnace effluent, the temperature within the separator 300, the composition of the furnace effluent and the first and second quench liquids, the pressure within the separator 300, and the flow rate of vapor product and the centrifugal separator drum bottoms through the separator 300. The residence time of the furnace effluent within the separator 300 can be about 1 second, about 5 seconds, or about 10 seconds to a about 20 seconds, about 30 seconds, about 60 seconds, or about 120 seconds. For example, the furnace effluent can have a residence time within the separator 300 of about 1 second to about 60 seconds or from about 1 second to about 20 seconds.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A furnace effluent upgrading process, comprising:
   contacting the furnace effluent with a first quench liquid to produce a quenched mixture, wherein (i) at least a portion of the furnace effluent is produced by steam cracking a hydrocarbon feed in a radiant section of a steam cracking furnace under steam cracking conditions comprising a temperature ≥760° C. and a residence time of ≤5 seconds, (ii) the furnace effluent comprises coke and/or tar, and (iii) the first quench liquid comprises one or more of a first steam cracker naphtha, a first steam cracker gas oil, and a first steam cracker quench oil;
   introducing the quenched mixture into a first inlet of a centrifugal separator;
   separating a vapor product and a centrifugal separator bottoms from the quenched mixture, wherein the centrifugal separator bottoms comprises at least a portion of the coke and/or at least a portion of the tar; and
   recovering the centrifugal separator bottoms from a first outlet of the centrifugal separator;
   further comprising introducing a second quench liquid into a second inlet of the centrifugal separator, wherein the second quench liquid comprises one or more of a second steam cracker naphtha, a second steam cracker gas oil, and a second steam cracker quench oil; further comprising introducing a recycle portion of the centrifugal separator bottoms tangentially onto a frustoconical inner wall of the centrifugal separator through a recycle fluid inlet of the centrifugal separator; and controlling the mass flow rate of the second quench liquid to maintain a solids content of ≤0.9 wt. % in the centrifugal separator bottoms.

2. The process of claim 1, wherein the frustoconical inner wall is at an angle of about 45° to about 80° with respect to a base of the frustoconical inner wall.

3. The process of claim 1, further comprising measuring a mass flow rate of the centrifugal separator bottoms at a location between the first outlet and the recycle inlet.

4. The process of claim 3, further comprising increasing the mass flow rate of the second quench liquid when the mass flow rate and/or velocity of the centrifugal separator bottoms is ≤90% of that achieved with a maximum recycle rate of the centrifugal separator bottoms.

5. The process of claim 1, further comprising recovering the vapor product from a second outlet of the centrifugal separator.

6. The process of claim 1, wherein (i) the furnace effluent includes a decoke effluent and (ii) the furnace effluent is at a temperature of about 425° C. to about 850° C. when the furnace effluent is contacted with the first quench liquid.

7. The process of claim 6, wherein the first quench liquid is at a temperature of about 30° C. to ≤175° C. when the furnace effluent is contacted with the first quench liquid.

8. The process of claim 1, wherein the first quench liquid and the second quench liquid each comprise ≤1 wt. % of water based on the weight of the first quench liquid or second quench liquid, respectively.

9. The process of claim 1, wherein:
   the hydrocarbon feed is in the form of a mixture comprising hydrocarbon and steam,
   the mixture comprises 0.2 kg to 4 kg of steam per kg of hydrocarbon in the mixture, the steam cracking conditions comprise a temperature ≥760° C. to 900° C., and
the furnace effluent comprises tar.

10. The process of claim 1, wherein the centrifugal separator is operated at a temperature of 135° C. to 200° C.

11. The process of claim 1, wherein:
the hydrocarbon feed is in the form of a mixture comprising hydrocarbon and steam,
the mixture comprises 0.2 kg to 4 kg of steam per kg of hydrocarbon in the mixture,
the steam cracking conditions comprise a temperature ≥760° C. to 900° C., and
the centrifugal separator is operated at a temperature of 135° C. to 200° C.

12. The process of claim 11, further comprising:
introducing a second quench liquid into a second inlet of the centrifugal separator, wherein the second quench liquid comprises one or more of a second steam cracker naphtha, a second steam cracker gas oil, and a second steam cracker quench oil;
introducing a recycle portion of the centrifugal separator bottoms tangentially onto a frustoconical inner wall of the centrifugal separator through a recycle fluid inlet of the centrifugal separator, wherein the frustoconical inner wall is at an angle of about 45° to about 80° with respect to a base of the frustoconical inner wall; and
recovering the vapor product from a second outlet of the centrifugal separator, wherein the first inlet is located between the second outlet and the recycle fluid inlet, and wherein the second inlet is located between the first outlet and the recycle fluid inlet.

13. The process of claim 1, further comprising:
introducing a second quench liquid into a second inlet of the centrifugal separator, wherein the second quench liquid comprises one or more of a second steam cracker naphtha, a second steam cracker gas oil, and a second steam cracker quench oil; and
recovering the vapor product from a second outlet of the centrifugal separator, wherein the first inlet is located between the second outlet and the recycle fluid inlet, and wherein the second inlet is located between the first outlet and the recycle fluid inlet.

14. A process for removing coke, tar, or a mixture thereof from a furnace effluent comprising:
contacting a furnace effluent comprising coke and/or tar, with a first quench liquid to produce a partially-quenched mixture, wherein the first quench liquid comprises one or more of a first steam cracker naphtha, a first steam cracker gas oil, and a first steam cracker quench oil;
introducing the partially-quenched mixture into a first inlet of a centrifugal separator;
combining the partially quenched mixture in the centrifugal separator and a second quench liquid to produce a quenched mixture, the second quench liquid being introduced into a second inlet of the centrifugal separator at a second quench liquid mass flow rate, wherein the second quench liquid comprises one or more of a second steam cracker naphtha, a second steam cracker gas oil, and a second steam cracker quench oil;
separating a vapor product and a centrifugal separator bottoms from the quenched mixture, wherein the centrifugal separator bottoms comprises at least a portion of the coke and/or at least a portion of the tar;
recovering the centrifugal separator bottoms from a first outlet of the centrifugal separator;
recycling at least a portion of the centrifugal separator bottoms tangentially onto a frustoconical inner wall of the centrifugal separator through a recycle inlet of the centrifugal separator;
measuring a centrifugal separator bottoms mass flow rate at a location between the first outlet and the recycle inlet; and
increasing the flow rate of the second quench liquid when the centrifugal separator bottoms mass flow rate is ≤90% of a maximum recycle rate of the centrifugal separator bottoms.

15. The process of claim 14, wherein the centrifugal separator is a centrifugal separator drum, and wherein the process further comprises recovering the vapor product from a second outlet of the centrifugal separator.

16. The process of claim 14, wherein (i) the furnace is undergoing on-stream decoking, (ii) the furnace effluent includes decoking effluent, and (iii) the furnace effluent is at a temperature of about 425° C. to about 850° C. when the furnace effluent is contacted with the first quench liquid.

17. The process of claim 16, wherein the first quench liquid is at a temperature of about 30° C. to ≤150° C. when the furnace effluent is contacted with the first quench liquid.

18. The process of claim 14, wherein the flow rate of the second quench liquid is adjusted to maintain a solids content of ≤0.9 wt. % in the centrifugal separator bottoms.

19. The process of claim 14, wherein the first quench liquid, the second quench liquid, and the centrifugal separator bottoms each comprise ≤1 wt. % of water based on the weight of the first quench liquid, the second quench liquid, and the centrifugal separator bottoms, respectively.

20. The process of claim 14, wherein at least a portion of the furnace effluent is produced by steam cracking a hydrocarbon feed in a radiant section of a steam cracking furnace under steam cracking conditions comprising a temperature ≥760° C. and a residence time of ≤5 seconds.

21. A process for upgrading a furnace effluent from a steam cracker operating in on-stream decoking mode, the process comprising:
contacting the furnace effluent with a first quench liquid to produce a quenched mixture, wherein the first quench liquid comprises a first steam cracker naphtha, a first steam cracker gas oil, a first steam cracker quench oil, or a mixture thereof, wherein the furnace effluent is at a temperature of about 425° C. to about 850° C. and the first quench liquid is at a temperature of about 30° C. to 200° C. when the furnace effluent is contacted with the first quench liquid, and wherein the furnace effluent comprises coke, tar, or a mixture thereof;
introducing the quenched mixture into a first inlet of a centrifugal separator drum;
introducing a second quench liquid comprising a second steam cracker naphtha, a second steam cracker gas oil, a second steam cracker quench oil, or a mixture thereof into a second inlet of the centrifugal separator drum at a second quench liquid flow rate, wherein the centrifugal separator drum contains the quenched mixture;
separating a vapor product and a centrifugal drum bottoms from the quenched mixture and the second quenched liquid, wherein the centrifugal drum bottoms comprises at least a portion of the coke, tar, or the mixture thereof;
recovering the centrifugal drum bottoms from a first outlet of the centrifugal separator drum;
introducing a recycle fluid tangentially onto a frustoconical inner wall of the centrifugal separator drum through a recycle fluid inlet of the centrifugal separator drum, wherein the recycle fluid comprises at least a portion of the centrifugal separator drum bottoms;

measuring a centrifugal separator drum bottoms flow rate between the first outlet and the recycle fluid inlet; and increasing the flow rate of the second quench liquid when the centrifugal separator drum bottoms flow rate is ≤90% of a maximum recycle rate of the centrifugal separator drum bottoms.

22. The process of claim 21, wherein:

at least a portion of the furnace effluent is produced by steam cracking a hydrocarbon feed in a radiant section of the steam cracker under steam cracking conditions comprising a temperature ≥760° C. and a residence time of ≤5 seconds, the first quench liquid is at a temperature of 30° C. to ≤175° C. when the furnace effluent is contacted with the first quench liquid, the furnace effluent comprises tar, and the centrifugal separator drum is operated at a temperature of 135° C. to 200° C.

\* \* \* \* \*